United States Patent
Nakata et al.

(10) Patent No.: US 10,700,374 B2
(45) Date of Patent: Jun. 30, 2020

(54) HIGH-TEMPERATURE OPERATING FUEL CELL SYSTEM

(71) Applicant: Panasonic Intellectual Property Management Co., Ltd., Osaka (JP)

(72) Inventors: Hideki Nakata, Kyoto (JP); Kunihiro Ukai, Nara (JP); Masakazu Aoki, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 263 days.

(21) Appl. No.: 15/817,340

(22) Filed: Nov. 20, 2017

(65) Prior Publication Data

US 2018/0151904 A1    May 31, 2018

(30) Foreign Application Priority Data

Nov. 29, 2016 (JP) .................................. 2016-231516

(51) Int. Cl.
*H01M 8/12* (2016.01)
*H01M 8/04007* (2016.01)
(Continued)

(52) U.S. Cl.
CPC .......... *H01M 8/12* (2013.01); *H01M 8/04007* (2013.01); *H01M 8/04022* (2013.01);
(Continued)

(58) Field of Classification Search
CPC ............... H01M 8/12; H01M 8/04007; H01M 8/04022; H01M 8/04067; H01M 8/04097
See application file for complete search history.

(56) References Cited

U.S. PATENT DOCUMENTS

| | | | |
|---|---|---|---|
| 5,998,053 A | 12/1999 | Diethelm | |
| 2006/0251939 A1* | 11/2006 | Bandhauer | H01M 8/04014 429/435 |
| 2012/0178003 A1 | 7/2012 | Venkataraman et al. | |

FOREIGN PATENT DOCUMENTS

| | | |
|---|---|---|
| DE | 102016206157 A1 | 10/2016 |
| JP | 2003-017103 | 1/2003 |
| JP | 2009-170170 | 7/2009 |

OTHER PUBLICATIONS

The Extended European Search Report dated Feb. 9, 2018 for the related European Patent Application No. 17203359.9.

* cited by examiner

*Primary Examiner* — James Lee
(74) *Attorney, Agent, or Firm* — McDermott Will & Emery LLP

(57) ABSTRACT

A high-temperature operating fuel cell system includes: a fuel cell stack that generates electric power through an electrochemical reaction of an oxidant gas and a reformed gas; a combustor that combusts a cathode off-gas and an anode off-gas; a reformer that generates the reformed gas from a raw material by utilizing heat of an exhaust gas generated by the combustor; a first preheater; a second preheater that preheats the oxidant gas through heat exchange with the exhaust gas and supplies the preheated oxidant gas to the cathode of the fuel cell stack; a casing that contains these components; and a first heat insulator that covers at least part of the casing, wherein the first preheater covers the first heat insulator and preheats the oxidant gas by heat transferred from the casing through the first heat insulator before the oxidant gas is supplied to the second preheater.

10 Claims, 6 Drawing Sheets

(51) Int. Cl.
*H01M 8/0612* (2016.01)
*H01M 8/04014* (2016.01)
*H01M 8/04089* (2016.01)
*H01M 8/1246* (2016.01)
H01M 8/14 (2006.01)
H01M 8/124 (2016.01)

(52) U.S. Cl.
CPC ... *H01M 8/04067* (2013.01); *H01M 8/04097* (2013.01); *H01M 8/0625* (2013.01); *H01M 8/1246* (2013.01); H01M 2008/1293 (2013.01); H01M 2008/147 (2013.01); Y02E 60/526 (2013.01)

HIGH-TEMPERATURE OPERATING FUEL CELL SYSTEM

BACKGROUND

1. Technical Field

The present disclosure relates to a high-temperature operating fuel cell system that operates at high temperature.

2. Description of the Related Art

Fuel cells, even though they are compact, have high power generation efficiency. Since heat generated during power generation or heat of exhaust gas resulting from combustion of off-gas discharged from the fuel cells can be utilized, overall power generation efficiency can be increased. For example, in previously proposed fuel cell systems, the power generation reaction in the solid oxide fuel cells (SOFC) is stabilized, and the efficiency is improved (for example, Japanese Unexamined Patent Application Publication No. 2009-170170 and Japanese Patent No. 3913008).

In the structure shown in the fuel cell system according to Japanese Unexamined Patent Application Publication No. 2009-170170, heat insulation of a heat insulating container that contains a fuel cell assembly, a heat exchanger unit, etc. is improved through the arrangement of a core vacuum insulation can and a heat-insulating material. With this structure of the solid oxide fuel cell system according to Japanese Unexamined Patent Application Publication No. 2009-170170, heat dissipation to the outside of the heat insulating container can be reduced.

In the structure shown in the fuel cell system according to Japanese Patent No. 3913008, exhaust fuel discharged from the SOFC is completely combusted in a combustor, and the exhaust gas discharged from the combustor exchanges heat with a first air preheater, a second air preheater, and an evaporator. With this structure of the fuel cell system according to Japanese Patent No. 3913008, the heat recovered by the first air preheater, the second air preheater, etc. can be utilized to preheat air introduced from the outside, and the efficiency of the fuel cell system can be increased.

SUMMARY

One non-limiting and exemplary embodiment provides a high-temperature operating fuel cell system in which the amount of heat dissipated to the outside is reduced and the power generation efficiency of the system can thereby be increased.

In one general aspect, the techniques disclosed here feature a high-temperature operating fuel cell system comprising: a fuel cell stack that includes a cathode and an anode and generates electric power through an electrochemical reaction of an oxidant gas supplied to the cathode and a reformed gas supplied to the anode; a combustor that combusts a cathode off-gas discharged from the cathode of the fuel cell stack and an anode off-gas discharged from the anode; a reformer that generates the reformed gas from a raw material supplied, the reformed gas being generated through a reforming reaction by utilizing heat of an exhaust gas generated by the combustor; a first preheater; a second preheater that preheats the oxidant gas through heat exchange with the exhaust gas whose heat has been partially used for the reforming reaction in the reformer and supplies the preheated oxidant gas to the cathode of the fuel cell stack; a casing that contains the fuel cell stack, the combustor, the reformer, and the second preheater; and a first heat insulator that covers at least part of an outer circumference of the casing, wherein the first preheater covers an outer circumference of the first heat insulator and preheats the oxidant gas by heat transferred from inside of the casing through the first heat insulator before the oxidant gas is supplied to the second preheater.

The high-temperature operating fuel cell system according to the above aspect of the present disclosure has the effect of reducing the amount of heat dissipated to the outside to thereby increase power generation efficiency.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
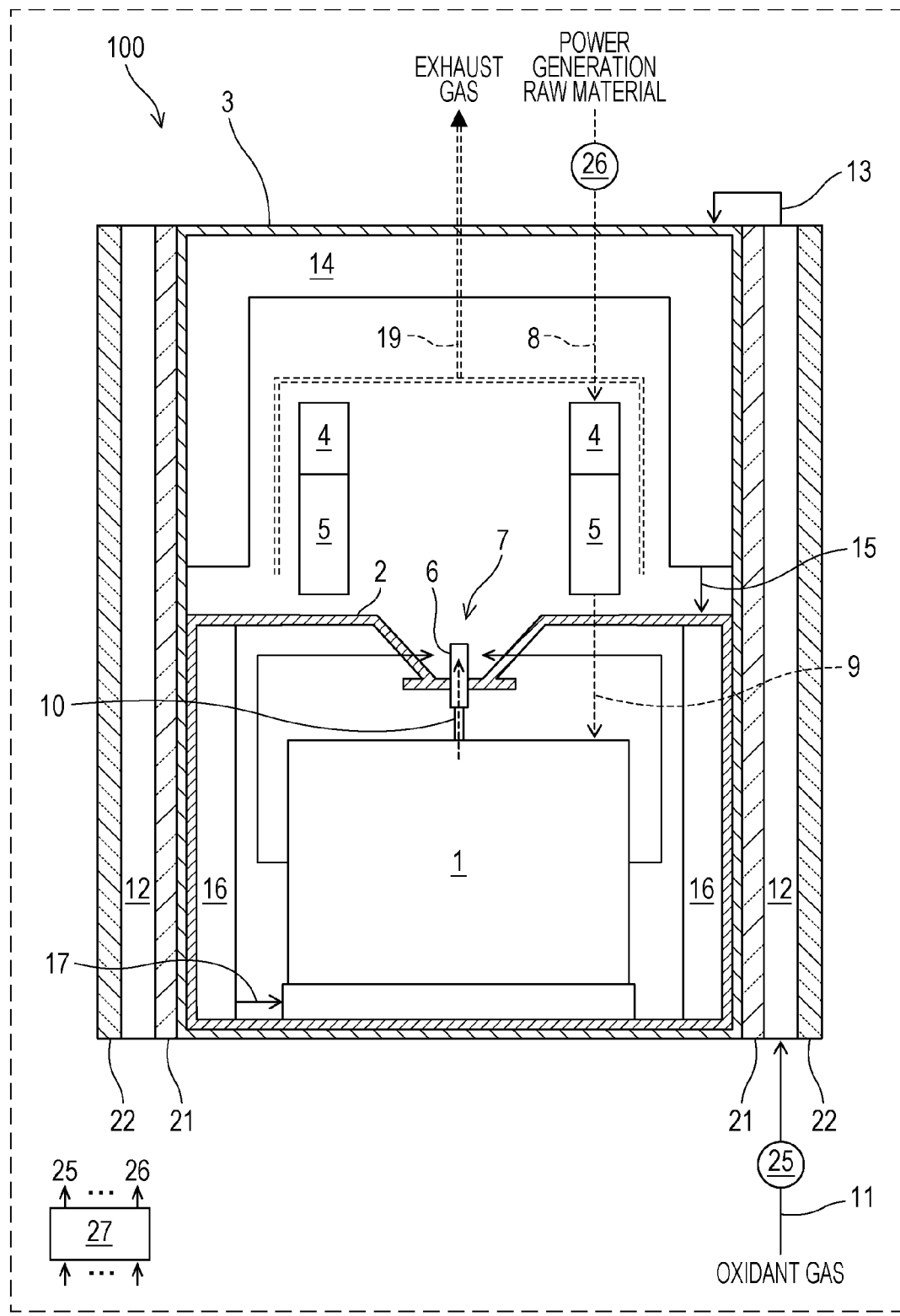
FIG. 1 is a side view showing an example of a schematic structure of a high-temperature operating fuel cell system according to embodiment 1 of the present disclosure.

Underlying Knowledge Forming Basis of the Present Disclosure

The present inventors have conducted extensive studies on a solid oxide fuel cell system (hereinafter referred to as an SOFC system), which is an example of a high-temperature operating fuel cell that can effectively utilize exhaust heat. As a result, the inventors have obtained the following findings.

The above-described SOFC system according to Japanese Unexamined Patent Application Publication No. 2009-170170 has a structure in which the core vacuum insulation can and the heat-insulating material are disposed along the inner circumference of exterior walls of the heat insulating container main body. However, the inventors have found that this structure has a problem in that the temperature of the exterior walls is still high and the heat insulation performance is not sufficient. To sufficiently reduce the amount of heat dissipated to the outside in the SOFC system according to Japanese Unexamined Patent Application Publication No. 2009-170170, it is necessary to increase the thickness of the heat-insulating material, and it is therefore difficult to reduce the size of the SOFC system. Another problem occurs when the core vacuum insulation can is formed of a metal such as SUS. In this case, if the surface temperature of the vacuum heat insulating container itself is increased to, for example, 500° C. or higher during operation of the SOFC system, the durability of the core vacuum insulation cannot be ensured sufficiently.

In the SOFC system according to Japanese Patent No. 3913008, the heat of the exhaust gas is recovered, and this can improve the power generation efficiency of the SOFC system. However, the inventors have found that the SOFC system according to Japanese Patent No. 3913008 has a problem in that the power generation efficiency cannot be improved significantly because the amount of heat dissipated from inside of the SOFC system to the outside cannot be reduced sufficiently.

In view of the problems in the related art, the present inventors have conducted repeated studies and found the following. In order to reduce the size of an SOFC system by reducing the thickness of the heat-insulating material as much as possible and to achieve an improvement in power generation efficiency by reducing the amount of heat dissipated from the inside of the SOFC system to the outside, it is necessary to provide, in addition to the heat-insulating material, a mechanism for improving the heat insulating performance significantly to the SOFC system. Specifically, the inventors have found a structure that can improve the heat insulating performance significantly. In this structure, a combination of a heat-insulating material and preheaters that can recover heat in the SOFC system efficiently and supply preheated air to the SOFC is disposed appropriately. With this structure, the surface temperature of the heat-insulating material can be reduced, and the service life of the heat-insulating material can be ensured. Therefore, in addition to the improvement in the heat dissipation performance and the reduction in size, an improvement in the reliability of the system can be achieved. In this structure, by controlling the flow rate of the oxidant gas (air) supplied to the SOFC, its heat recovery performance and heat insulating performance can be controlled. More specifically, the present disclosure provides the following aspects.

To solve the above problems, a high-temperature operating fuel cell system according to a first aspect of the present disclosure comprises: a fuel cell stack that includes a cathode and an anode and generates electric power through an electrochemical reaction of an oxidant gas supplied to the cathode and a reformed gas supplied to the anode; a combustor that combusts a cathode off-gas discharged from the cathode of the fuel cell stack and an anode off-gas discharged from the anode; a reformer that generates the reformed gas from a raw material supplied, the reformed gas being generated through a reforming reaction by utilizing heat of an exhaust gas generated by the combustor; a first preheater; a second preheater that preheats the oxidant gas through heat exchange with the exhaust gas whose heat has been partially used for the reforming reaction in the reformer and supplies the preheated oxidant gas to the cathode of the fuel cell stack; a casing that contains the fuel cell stack, the combustor, the reformer, and the second preheater; and a first heat insulator that covers at least part of an outer circumference of the casing, wherein the first preheater covers an outer circumference of the first heat insulator and preheats the oxidant gas by heat transferred from inside of the casing through the first heat insulator before the oxidant gas is supplied to the second preheater.

In the above structure, since the first heat insulator and the first preheater are provided, the amount of heat dissipated from the inside of the casing to the outside can be reduced. In the first preheater, the heat transferred from the inside of the casing through the first heat insulator can be recovered by the oxidant gas to be supplied to the fuel cell stack. Moreover, in the second preheater, the heat of the exhaust gas generated in the combustor can be recovered by the oxidant gas to be supplied to the fuel cell stack. As described above, the exhaust heat in the high-temperature operating fuel cell system can be efficiently recovered by the oxidant gas, and the oxidant gas preheated by the recovered heat can be supplied to the fuel cell stack, so that the power generation efficiency can be increased.

The high-temperature operating fuel cell system according to the first aspect of the present disclosure has the effect of reducing the amount of heat dissipated to the outside to thereby increase the power generation efficiency.

Since the first preheater is provided, the temperature of the first heat insulator can be lower than that when the first preheater is not provided. Therefore, the thickness of the first heat insulator can be reduced, and this allows the overall dimensions of the high-temperature operating fuel cell system to be reduced.

According to a second aspect of the present disclosure, the high-temperature operating fuel cell system described in the first aspect may further comprise a second heat insulator that covers an outer circumference of the first preheater.

In the above structure, since the second heat insulator is further provided, the amount of heat dissipated from the inside of the casing to the outside can be further reduced. Therefore, in the high-temperature operating fuel cell system according to the second aspect of the present disclosure, the power generation efficiency can be further increased.

According to a third aspect of the present disclosure, the high-temperature operating fuel cell system described in the first aspect may further comprise: a fuel cell stack container that contains the fuel cell stack and allows the cathode off-gas discharged from the cathode of the fuel cell stack to flow inside the fuel cell stack container and to be introduced into the combustor; and a third preheater that is disposed on an inner wall of the fuel cell stack container, preheats the cathode off-gas flowing through the fuel cell stack container, and further preheats the oxidant gas preheated in the second preheater before the oxidant gas is supplied to the fuel cell stack.

In the above structure, the third preheater is further provided in the fuel cell stack container. Therefore, in the third preheater, the heat of the cathode off-gas can be recovered by the oxidant gas, and the resulting oxidant gas can be supplied to the fuel cell stack. This allows the power generation efficiency to be further increased.

According to a fourth aspect of the present disclosure, in the high-temperature operating fuel cell system described in the third aspect, the combustor may be disposed on an upper surface of the fuel cell stack container, and the first preheater may surround at least a side portion of the fuel cell stack container and a side portion of the combustor.

According to a fifth aspect of the present disclosure, in the high-temperature operating fuel cell system described in the third aspect, the oxidant gas may flow through the first preheater, the second preheater, and the third preheater in this order and may then be supplied to the fuel cell stack, and the first preheater may preheat the oxidant gas supplied from outside by heat transferred from the inside of the casing through the first heat insulator. The second preheater may preheat the oxidant gas preheated in the first preheater by the heat of the exhaust gas that has been partially used for the reforming reaction in the reformer, and the third preheater may preheat the oxidant gas preheated in the second preheater by heat of the cathode off-gas flowing through the fuel cell stack container.

In the above structure, the heat transferred from the inside of the casing through the first heat insulator can be recovered by the oxidant gas flowing through the first preheater. The heat of the exhaust gas generated in the combustor can be recovered by the oxidant gas flowing through the second preheater. Moreover, the heat of the cathode off-gas can be recovered by the oxidant gas flowing through the third preheater. Therefore, the power generation efficiency can be further increased. The oxidant gas is preheated in the first preheater, the second preheater, and the third preheater. This allows the oxidant gas originally at a temperature about the temperature of outside air to be heated to a temperature close to the temperature of the fuel cell stack, so that the temperature of the fuel cell stack can be stabilized. Therefore, the high-temperature operating fuel cell system can maintain stable power generation.

According to a sixth aspect of the present disclosure, in the high-temperature operating fuel cell system described in the fifth aspect, the reformer may be disposed above the combustor, and the fuel cell stack may be disposed below the combustor. The casing may further contain: a first oxidant gas passage which is disposed between the second preheater and the third preheater and through which the oxidant gas flows from the second preheater to the third preheater; and an exhaust gas passage through which the exhaust gas generated in the combustor flows and is introduced to the outside. The reformer, the combustor, the fuel cell stack, and the exhaust gas passage may be surrounded by the second preheater, the first oxidant gas passage, and the third preheater.

In the above structure, all the members contained in the casing which include the reformer, the combustor, the fuel cell stack, and the exhaust gas passage are surrounded by the second preheater, the first oxidant gas passage, and the third preheater.

The second preheater, the first oxidant gas passage, and the third preheater form a passage through which the oxidant gas flows. When the oxidant gas is air, the air can be regarded as forming an air layer together with these members. Therefore, all the members in the casing which include the reformer, the combustor, the fuel cell stack, and the exhaust gas passage that are heated to high temperature are surrounded by the air layer, so that the amount of heat dissipated to the outside can be reduced significantly.

This allows the thicknesses of the first and second heat insulators and the first preheater that surround the outer circumference of the casing to be reduced, and the high-temperature operating fuel cell system can be reduced in size and cost.

According to a seventh aspect of the present disclosure, in the high-temperature operating fuel cell system described in the second aspect, the second heat insulator may be formed of a vacuum heat-insulating material. When the second heat insulator is formed of the vacuum heat-insulating material, the heat insulating performance can be higher than that when the second heat insulator is formed of, for example, a general-purpose heat-insulating material such as glass wool.

The vacuum heat-insulating material used may be, for example, a heat-insulating material including a casing member formed from a metal laminate film and a core member formed from a porous structural material such as glass wool. The vacuum heat-insulating material is prepared by reducing the pressure inside the casing member and then sealing the resulting casing member.

According to an eighth aspect of the present disclosure, the high-temperature operating fuel cell system described in the first aspect may further comprise an oxidant gas flow rate controller that controls a flow rate of the oxidant gas supplied to the first preheater. The oxidant gas flow rate controller may control the flow rate of the oxidant gas to thereby adjusting an amount of heat dissipated from the inside of the casing to the outside.

In the above structure, since the oxidant gas flow rate controller is provided, the flow rate of the oxidant gas supplied to the fuel cell stack can be controlled. When the oxidant gas flow rate controller is controlled such that the flow rate of the oxidant gas supplied increases, the heat recovery ability of the oxidant gas flowing through the first preheater, the second preheater, and the third preheater increases. The heat insulating performance is thereby improved, and the amount of heat dissipated from the inside of the casing to the outside can be further reduced. When the oxidant gas flow rate controller is controlled such that the flow rate of the oxidant gas supplied decreases, the heat recovery ability of the oxidant gas flowing through the first preheater, the second preheater, and the third preheater decreases. Therefore, the heat insulating performance is reduced, and the amount of heat dissipated from the inside of the casing to the outside can be increased.

As described above, in the high-temperature operating fuel cell system according to the eighth aspect, since the heat insulating performance can be controlled, the amount of heat dissipated from the inside of the casing to the outside can be adjusted to a desired level according to the operating conditions of the high-temperature operating fuel cell system.

According to a ninth aspect of the present disclosure, the high-temperature operating fuel cell system described in the second aspect may further comprise an oxidant gas flow rate controller that controls a flow rate of the oxidant gas supplied to the first preheater. The oxidant gas flow rate controller may control the flow rate of the oxidant gas such that a temperature of an inner circumference of the second heat insulator is 200° C. or lower.

Embodiments of the present disclosure will next be described with reference to the drawings. In the embodiments of the present disclosure, an SOFC system including a solid oxide fuel cell (SOFC) as a power generator will be described as an example of a high-temperature operating fuel cell system 100, but this is not a limitation. For example, the high-temperature operating fuel cell system 100 may be an MCFC system including a molten carbonate fuel cell (MCFC) as the power generator or may be any fuel cell system that can effectively utilize high-temperature exhaust heat.

Embodiment 1

(Structure of High-Temperature Operating Fuel Cell System)

Referring first to FIG. 1, the structure of a high-temperature operating fuel cell system 100 according to embodiment 1 will be described. FIG. 1 is a side view showing an example of a schematic structure of the high-temperature operating fuel cell system 100 according to embodiment 1 of the present disclosure. FIG. 1 shows the structure of a principal part of the high-temperature operating fuel cell system 100 when it is viewed from a side. The high-temperature operating fuel cell system 100 may have a cylindrical shape or a cuboidal shape with the lower surface in the drawing sheet serving as a bottom surface and the upper surface serving as a top surface. In the present specification, a gas supplied from the outside through a power generation raw material supply passage 8 is referred to as a power generation raw material, and a power generation raw material reformed through a reforming reaction in a reformer 5 is referred to as a reformed gas.

The high-temperature operating fuel cell system 100 generates electric power through an electrochemical reaction of an oxidant gas such as air supplied from the outside and a reformed gas obtained by reforming the power generation raw material such as a natural gas supplied from the outside. As shown in FIG. 1, the high-temperature operating fuel cell system 100 includes a fuel cell stack 1, a fuel cell stack container 2, an evaporator 4, the reformer 5, an injector 6, a combustor 7, the power generation raw material supply passage 8, a reformed gas passage 9, an anode off-gas passage 10, an oxidant gas supply passage 11, a first preheater 12, an oxidant gas casing supply passage 13, a second preheater 14, a first oxidant gas passage 15, a third preheater 16, a second oxidant gas passage 17, an exhaust gas passage 19, an oxidant gas feeder 25, a power generation raw material feeder 26, and a controller 27.

Specifically, as shown in FIG. 1, the high-temperature operating fuel cell system 100 further includes a casing 3, a first heat insulator 21 that covers at least part of the outer circumference of the casing 3, the first preheater 12 that covers the outer circumference of the first heat insulator 21, and a second heat insulator 22 that covers the outer circumference of the first preheater 12.

The casing 3 contains the fuel cell stack 1, the fuel cell stack container 2, the evaporator 4, the reformer 5, the injector 6, the combustor 7, the reformed gas passage 9, the anode off-gas passage 10, the second preheater 14, the first oxidant gas passage 15, the second oxidant gas passage 17, and the exhaust gas passage 19.

The structure in the casing 3 will first be described. The fuel cell stack 1 is formed by stacking a plurality of single fuel cells each generating electric power through an electrochemical reaction of the oxidant gas supplied from the outside and the reformed gas generated through the reforming reaction in the reformer 5. For example, the fuel cell stack 1 may have a structure in which the plurality of stacked single cells are connected in series. The fuel cell stack 1 may be formed by stacking a plurality of flat plate-shaped fuel cells or may be formed by stacking a plurality of cylindrical fuel cells. In the high-temperature operating fuel cell system 100 according to embodiment 1, the fuel cell stack 1 operates at a high-temperature of about 600° C. or higher. The fuel cell stack 1 may include, for example, a temperature sensor that detects the operating temperature of the fuel cell stack 1 and an electrode used to collect the current generated in the fuel cell stack 1, although they are not illustrated.

The single cells included in the fuel cell stack 1 may be, for example, single fuel cells formed from yttria-doped zirconia (YSZ), zirconia doped with ytterbium or scandium, or a lanthanum gallate-based solid electrolyte. When the single fuel cells are formed from YSZ, the power generation reaction is performed within the temperature range of about 600 to about 900° C., which depends on the thickness of the cells.

The fuel cell stack container 2 is a container that contains the fuel cell stack 1. The fuel cell stack container 2 is formed from, for example, a refractory metal that exhibits heat resistance in the temperature range of 600° C. to 900° C. At least the side surface(s) of the fuel cell stack container 2 is(are) covered with the first heat insulator 21, and the first preheater 12 is disposed on the outer circumference of the first heat insulator 21 so as to cover the first heat insulator 21. The second heat insulator 22 is disposed on the outer circumference of the first preheater 12 so as to cover the first preheater 12. As shown in FIG. 1, the region in which the first heat insulator 21, the first preheater 12, and the second heat insulator 22 are disposed includes a region corresponding to the side surface(s) of the fuel cell stack container 2 and a region surrounding the combustor 7, the evaporator 4, the reformer 5, and the second preheater 14. In other words, the first heat insulator 21, the first preheater 12, and the second heat insulator 22 may be disposed so as to cover the side surface(s) of the casing 3. The first heat insulator 21, the first preheater 12, and the second heat insulator 22 are disposed so as to cover at least a portion of the outer circumference of the casing 3 to which portion high-temperature heat is transferred.

The first preheater 12 may include a metal-made inner tube surrounding the first heat insulator 21 and a metal-made outer tube surrounding the outer circumference of the inner tube, and the oxidant gas may flow through the space formed between the inner tube and the outer tube. The details of the first heat insulator 21 and the second heat insulator 22 will be described later.

In the fuel cell stack container 2, the cathode off-gas discharged from the cathode of the fuel cell stack 1 flows through the space containing the fuel cell stack 1. The third preheater 16 is disposed inside the fuel cell stack container 2. In the third preheater 16, heat is exchanged between the oxidant gas to be supplied to the cathode side of the fuel cell stack 1 and the cathode off-gas discharged from the fuel cell stack 1, and the oxidant gas can thereby be preheated. The third preheater 16 is disposed along the inner side surface(s) of the fuel cell stack container 2. In other words, the third preheater 16 is disposed inside the fuel cell stack container 2 so as to surround the side surface(s) of the fuel cell stack 1. The third preheater 16 may be configured similarly to the first preheater 12. Specifically, a metal-made inner tube may surround the side surface(s) of the fuel cell stack 1, and a metal made outer tube may surround the outer circumference of the inner tube. The oxidant gas may flow through the space formed between the inner tube and the outer tube. The outer tube included in the third preheater 16 may serve also as the side wall(s) of the fuel cell stack container 2.

The injector 6 is used to inject the anode off-gas and is disposed in a central portion of the upper surface of the fuel cell stack container 2. The anode off-gas discharged from the anode of the fuel cell stack 1 flows through the anode off-gas passage 10 and is supplied to the injector 6.

As shown in FIG. 1, the central portion of the upper surface of the fuel cell stack container 2 is recessed so as to be tapered from the upper surface toward the bottom surface. This recess may form the combustor 7 that is a space for combustion of the anode off-gas and the cathode off-gas. The injector 6 is disposed at the center of the bottom of the recess so as to protrude upward and extend perpendicularly to the upper surface of the fuel cell stack container 2. The injector 6 may have, for example, a cylindrical shape, and a plurality of anode off-gas injection holes for injecting the anode off-gas may be provided on the side surface of the injector 6.

As described above, the high-temperature operating fuel cell system 100 is configured such that, during operation (power generation), the anode off-gas and the cathode off-gas not used for the power generation reaction are combusted in the combustor 7 to thereby generate a high-temperature exhaust gas and the heat of the exhaust gas is utilized effectively. This will be described in detail later. By appropriately arranging the first heat insulator 21, the second heat insulator 22, the first preheater 12, the second preheater 14, and the third preheater 16, the dissipation of heat from the inside of the casing 3 of the high-temperature operating fuel cell system 100 to the outside can be prevented as much as possible. This will be described in detail later.

As shown in FIG. 1, in the high-temperature operating fuel cell system 100, the fuel cell stack 1 is disposed below the combustor 7, and the second preheater 14 and the reformer 5 are disposed above the combustor 7. The heat of the exhaust gas generated in the combustor 7 is utilized to cover the heat necessary for the reforming reaction in the reformer 5 and to preheat the oxidant gas.

The second preheater 14 preheats the oxidant gas through heat exchange between the oxidant gas and the exhaust gas whose heat has been partially used for the reforming reaction in the reformer 5 and supplies the resulting oxidant gas to the fuel cell stack. The second preheater 14 may have a structure including a combination of two metal-made coaxially extending tubular members having different diameters and each having an open bottom. The oxidant gas may flow through the space formed between the inner and outer tubular members.

The reformer 5 may generate the reformed gas from the power generation raw material through a partial oxidation reforming reaction. It is advantageous that the reformer 5 is capable of generating the reformed gas from the power generation raw material not only through the partial oxidation reforming reaction but also through a steam reforming reaction. When the reformer 5 generates the reformed gas from the power generation raw material through the partial oxidation reforming reaction, the evaporator 4 is not necessarily provided.

When the reformer 5 generates the reformed gas from the power generation raw material through the steam reforming reaction, the power generation raw material is mixed with water vaporized by the evaporator 4 disposed upstream of the reformer 5, and the mixture is supplied to the reformer 5. A reforming catalyst charged into the reformer 5 may be appropriately selected from an alumina-supported nickel catalyst ($Ni/Al_2O_3$), an alumina-supported ruthenium catalyst ($Ru/Al_2O_3$), etc.

The power generation raw material supplied to the reformer 5 may contain, as an odorant or a material originating from the raw material, a sulfur component. Therefore, a desulfurizer may be disposed upstream of the reformer 5 and the evaporator 4, and the power generation raw material desulfurized by the desulfurizer may be supplied to the reformer 5 and the evaporator 4.

In one example of the desulfurizer, a method in which the sulfur component contained in the power generation raw material is removed by hydrodesulfurization is used. A desulfurizing agent charged into the desulfurizer is, for example, a desulfurizing agent containing copper and zinc. The desulfurizing agent used is not limited to the above-described desulfurizing agent so long as the hydrodesulfurization can be performed, and the desulfurizing agent used may be a combination of zinc oxide and a Ni—Mo-based or Co—Mo-based catalyst. When the desulfurizing agent is a combination of zinc oxide and a Ni—Mo-based or Co—Mo-based catalyst, organic sulfur in the power generation raw material is hydrocracked in the desulfurizer in the temperature range of 350 to 400° C. In the desulfurizer, the $H_2S$ generated is then removed by adsorption on ZnO in the temperature range of 350 to 400° C. For example, when the power generation raw material is town gas, the town gas contains, as an odorant, dimethyl sulfide ($C_2H_6S$, DMS) which is a sulfur compound. In the desulfurizer, the DMS is removed by the desulfurizing agent in the form of ZnS through reactions represented by formulas (1) and (2) or by physical adsorption on the desulfurizing agent.

$$C_2H_6S+2H_2 \rightarrow 2CH_4+H_2S \quad (1)$$

$$H_2S+ZnO \rightarrow H_2O+ZnS \quad (2)$$

The odorant contained in the power generation raw material may be a sulfur compound other than the DMS described above such as TBM ($C_4H_{10}S$) or THT ($C_4H_8S$).

When the desulfurizing agent charged contains copper and zinc, the desulfurizer performs desulfurization in the temperature range of about 10 to about 400° C. and preferably about 150 to about 300° C. The copper-zinc-based desulfurizing agent has, in addition to the hydrodesulfurization ability, physical adsorption ability. Physical adsorption is dominant at low temperature, and chemical adsorption ($H_2S+ZnO \rightarrow H_2O+ZnS$) is dominant at high temperature. In this case, the content of sulfur contained in the desulfurized power generation raw material is 1 vol. ppb (parts per billion) or less and generally 0.1 vol. ppb or less.

As described above, when the desulfurizer is charged with a Ni—Mo-based or Co—Mo-base catalyst or a desulfurizing agent containing one of copper and zinc, the amount of the sulfur component removed per unit volume is large. Therefore, when the above-described desulfurizing agent is used for removal of sulfur, the amount of the desulfurizing agent necessary to reduce the sulfur concentration to a desired level can be reduced.

(First Heat Insulator and Second Heat Insulator)

The first heat insulator 21 and the second heat insulator 22 included in the high-temperature operating fuel cell system 100 will next be described in detail.

The heat-insulating material forming the first heat insulator 21 is preferably a heat-insulating material that can withstand a high temperature of 600° C. or higher, and any general-purpose heat-insulating material can be used so long as it has heat resistance. Examples of the heat-insulating material forming the first heat insulator 21 include glass wool, Superwool, rock wool, ceramic fibers, mineral wool, calcium silicate, and rigid polyurethane foams. A special heat-resistant heat-insulating material prepared by mixing fumed silica as a main component, an inorganic fibrous material, and an infrared shielding material may also be used.

A general-purpose heat-insulating material can be used for the second heat insulator 22 disposed on the outer circumference side of the first preheater 12. Specifically, since the temperature of the outer surface of the first preheater 12 is low, e.g., 200° C. or lower, limitations on the usable heat-insulating material are small. Examples of the general-purpose heat-insulating material include glass wool, rock wool, ceramic fibers, mineral wool, and calcium silicate. A special heat-resistant heat-insulating material prepared by mixing fumed silica as a main component with an inorganic fibrous material and an infrared shielding material that are used for reinforcement may also be used. Moreover, the second heat insulator 22 may be formed of, for example, a vacuum heat-insulating material including a casing member formed from a metal laminate film and a core member formed from a porous structural member such as glass wool. The vacuum heat-insulating material is prepared by reducing the pressure inside the casing member and then sealing the resulting casing member.

When the vacuum heat-insulating material is used as the heat-insulating material of the second heat insulator 22, the heat insulating performance can be improved significantly. For example, by changing the heat-insulating material of the second heat insulator 22 from a general-purpose heat-insulating material such as glass wool to the vacuum heat-insulating material, the thermal conductivity of the second heat insulator 22 is reduced to about 1/10 to about 1/20, so that the second heat insulator 22 can be significantly reduced in size (thickness). The lower the temperature of the second heat insulator 22, the longer the service life of the vacuum heat-insulating material.

When the second heat insulator 22 is disposed on the outer circumference side of the first preheater 12, the heat insulating performance of the high-temperature operating fuel cell system 100 can be further improved, and the amount of heat dissipated from the inside of the casing 3 to the outside can be reduced. The second heat insulator 22 is disposed at the outermost portion of the high-temperature operating fuel cell system 100. Therefore, even when the temperature of the outer circumferential surface of this high-temperature operating fuel cell system 100 is equal to the temperature of the outer circumferential surface of a high-temperature operating fuel cell system including a metal-made first preheater 12 disposed at its outermost portion, the sensible temperature of the high-temperature operating fuel cell system 100 can be lower because of the difference in thermal conductivity between the materials used.

The thickness of the second heat insulator 22 can be computed from the thermal conductivity of the second heat insulator 22 and the allowable amount of heat dissipation computed based on the power generation efficiency necessary for the high-temperature operating fuel cell system 100. Reference thermal conductivity values at about 100° C. to about 200° C. are as follows. The thermal conductivity of a general-purpose heat-insulating material such as glass wool is about 0.1 W/mK, and the thermal conductivity of a special heat-resistant heat-insulating material using fumed silica is about 0.024 W/mK. The thermal conductivity of a vacuum heat-insulating material is about 0.0012 W/mK. This shows that it is preferable to use a vacuum heat-insulating material as the heat-insulating material forming the second heat insulator 22 because the second heat insulator 22 can be reduced in thickness by a factor of 20 or more.

In the high-temperature operating fuel cell system 100, even when the temperature of the outer circumferential surface of the casing 3 is high, i.e., 600° C. to 800° C., the temperature of the inner circumferential surface of the second heat insulator 22 can be reduced to 200° C. or lower by adjusting the thickness of the first heat insulator 21 or controlling the flow rate of the oxidant gas supplied to thereby adjust the amount of heat exchanged in the first preheater 12. Therefore, even when the second heat insulator 22 is formed of a vacuum heat-insulating material, the service life of the second heat insulator 22 can be extended significantly because the second heat insulator 22 is not exposed to a high temperature exceeding 200° C.

In the high-temperature operating fuel cell system 100, when the first preheater 12 is capable of reducing the temperature of the outermost circumference to a desired level and the amount of heat dissipated to the outside falls within an allowable range, the second heat insulator 22 is not necessarily provided. In this case, the high-temperature operating fuel cell system 100 has a structure in which at least part of the outer circumference of the casing is covered with the first heat insulator 21 and the outer circumference of the first heat insulator 21 is covered with the first preheater 12.

As described above, in the high-temperature operating fuel cell system 100, the casing 3 contains the fuel cell stack 1, the fuel cell stack container 2, the evaporator 4, the reformer 5, the injector 6, the combustor 7, the power generation raw material supply passage 8, the reformed gas passage 9, the anode off-gas passage 10, the second preheater 14, the first oxidant gas passage 15, the third preheater 16, the second oxidant gas passage 17, and the exhaust gas passage 19, and the side surface(s) of the casing 3 is(are) surrounded by the first preheater 12, the first heat insulator 21, and the second heat insulator 22. As shown in FIG. 1, in the high-temperature operating fuel cell system 100, the second preheater 14, the first oxidant gas passage 15, and the third preheater 16 externally surround the evaporator 4, the reformer 5, the combustor 7, the fuel cell stack 1, the reformed gas passage 9, the anode off-gas passage 10, the exhaust gas passage 19, etc. within the casing 3. With this structure, the heat inside the casing 3 is prevented from being dissipated to the outside, and the inside can be maintained at high temperature. Since the first preheater 12 is provided, the first heat insulator 21 and the second heat insulator 22 can be reduced in thickness, and the high-temperature operating fuel cell system 100 can be reduced in size.

(Flows of Fluids in High-Temperature Operating Fuel Cell System)

The flows of fluids (the oxidant gas, the cathode off-gas, the reformed gas, and the anode off-gas) in the high-temperature operating fuel cell system 100 will be described.

In the high-temperature operating fuel cell system 100, the power generation raw material feeder 26 supplies the power generation raw material and water to the evaporator 4 and the reformer 5 at a prescribed flow rate through the power generation raw material supply passage 8 in response to a control signal from the controller 27. For the sake of convenience of description, the power generation raw material feeder 26 supplies the power generation raw material and water at a prescribed flow rate. However, a water feeder may be provided separately from the power generation raw material feeder 26, and water may be supplied to the evaporator 4 through a reformed water passage different from the power generation raw material supply passage 8.

The water supplied is converted to water vapor in the evaporator 4 by the heat of the exhaust gas flowing through the exhaust gas passage 19, and a gas mixture of the water vapor and the raw material is supplied to the reformer 5. The gas mixture supplied is used to allow the reforming reaction to proceed in the reformer 5 to thereby generate the reformed gas (anode gas). The reformed gas generated in the reformer 5 is supplied through the reformed gas passage 9 to the fuel cell stack 1 contained in the fuel cell stack container 2. The heat necessary for the reforming reaction in the reformer 5 and the heat necessary for vaporization of water in the evaporator 4 are covered by the heat of combustion in the combustor 7 and the heat of the exhaust gas flowing through the exhaust gas passage 19.

Specifically, in the high-temperature operating fuel cell system 100 according to embodiment 1, the reformer 5 is disposed below the evaporator 4, and the evaporator 4 and the reformer 5 are disposed above the combustor 7 or above the outer circumference of the combustor 7. The reformer 5 is heated by the heat of combustion in the combustor 7 and the heat of the exhaust gas, and the evaporator 4 placed above the reformer 5 is heated by the heat of the exhaust gas. The exhaust gas passage 19 is disposed between the second preheater 14 and the evaporator 4 and between the second preheater 14 and the reformer 5. The exhaust gas flowing through the exhaust gas passage 19 heats the reformer 5 and the evaporator 4, and part of the heat of the exhaust gas is thereby lost. Then the heat of the exhaust gas is further removed by heat exchange with the oxidant gas flowing through the second preheater 14, and the resulting exhaust gas is discharged to the outside.

In the high-temperature operating fuel cell system 100, the oxidant gas feeder 25 supplies the oxidant gas (air) to the first preheater 12 at a prescribed flow rate through the oxidant gas supply passage 11 in response to a control signal from the controller 27. When the oxidant gas supplied to the first preheater 12 flows through a flow passage in the first preheater 12, the oxidant gas is preheated by the heat transferred from the casing 3 to the first preheater 12 through the first heat insulator 21. In other words, the heat dissipated from the casing 3 to the outside can be recovered by the oxidant gas flowing through the first preheater 12. The heat transferred from the casing 3 is exchanged with the oxidant gas flowing through the first preheater 12, and this causes the temperature of the oxidant gas to increase from the outside air temperature to about 100° C. and also causes the surface temperature of the first heat insulator 21 in contact with the inner circumference of the first preheater 12 to be reduced to about 200° C. to about 400° C.

The oxidant gas preheated in the first preheater 12 is supplied to the second preheater 14 through the oxidant gas casing supply passage 13. In the second preheater 14, the oxidant gas is further preheated by the reforming reaction in the reformer 5 and by heat exchange with the exhaust gas whose heat has been partially used for vaporization of water in the evaporator 4. The exhaust gas whose heat has been further partially removed by heat exchange with the oxidant gas in the second preheater 14 is discharged to the outside through the exhaust gas passage 19.

As described above, the preheated oxidant gas flowing into the second preheater 14 can recover heat from the exhaust gas flowing through the casing 3 of the high-temperature operating fuel cell system 100.

The oxidant gas preheated in the second preheater 14 flows into the fuel cell stack container 2 through the first oxidant gas passage 15 and is introduced into the third preheater 16. In the third preheater 16, the oxidant gas preheated in the first preheater 12 and the second preheater 14 exchanges heat with the cathode off-gas discharged from the fuel cell stack 1. The oxidant gas is further preheated by heat exchange in the third preheater 16. The preheated oxidant gas is introduced into the fuel cell stack 1 through the second oxidant gas passage 17. As described above, the oxidant gas preheated in the second preheater 14 and flowing into the third preheater 16 can recover heat from the cathode off-gas. Then the oxidant gas having the desired temperature can be supplied to the fuel cell stack 1. This allows stable thermal independence to be achieved, and the power generation efficiency of the high-temperature operating fuel cell system 100 can be improved significantly.

The fuel cell stack 1 generates electric power through the electrochemical reaction of the reformed gas supplied and the oxidant gas supplied. The cathode off-gas containing the oxidant gas unused for power generation and the anode off-gas containing the reformed gas unused for power generation are discharged from the fuel cell stack 1. The cathode off-gas is discharged from the fuel cell stack 1 to the fuel cell stack container 2, exchanges heat with the oxidant gas flowing through the third preheater 16 as described above, and is then guided to the combustor 7.

The anode off-gas discharged from the fuel cell stack 1 is supplied to the injector 6 through the anode off-gas passage 10 and injected into the combustor 7 through the injector 6. In the combustor 7, the anode off-gas is ignited by an unillustrated ignitor and combusted together with the cathode off-gas.

(Control of Flow Rate and Temperature of Exhaust Gas)

In the high-temperature operating fuel cell system 100 according to embodiment 1, the evaporator 4, the reformer 5, and the second preheater 14 are disposed above the combustor 7. Therefore, the high-temperature exhaust gas can heat the oxidant gas flowing through the evaporator 4, the reformer 5, and the second preheater 14 to temperatures suitable for their functions.

The flow rate and temperature of the exhaust gas generated in the combustor 7 can be controlled by adjusting the ratio of the fuel used in the fuel cell stack 1 in response to a control signal from the controller 27. The ratio of the fuel used is the ratio of the fuel (reformed gas) consumed in the fuel cell stack 1 through the power generation reaction. Specifically, in response to the control signal from the controller 27, the oxidant gas feeder 25 controls the amount of the oxidant gas supplied, and the power generation raw material feeder 26 controls the amounts of the power generation raw material and water supplied, whereby the flow rate and temperature of the exhaust gas obtained by combustion in the combustor 7 can be controlled. During the operation of the high-temperature operating fuel cell system 100 according to embodiment 1, the ratio of the fuel used is set such that, for example, the fuel cell stack 1 is heated within the temperature range of about 600 to about 900° C. by the heat of combustion in the combustor 7 and radiant heat. The controller 27 and the oxidant gas feeder 25 form an oxidant gas flow rate controller in the present disclosure.

The evaporator 4 and the reformer 5 are heated by the heat of the exhaust gas generated in the combustor 7. In this case, part of the heat of the exhaust gas is consumed. The exhaust gas whose heat has been partially consumed exchanges heat with the oxidant gas flowing through the second preheater 14. Therefore, the heat of the exhaust gas is further removed, and the resulting exhaust gas is cooled to a temperature suitable for discharge to the outside. Specifically, although the temperature of the exhaust gas generated in the combustor 7 is high, e.g., about 600° C. to about 900° C., the heat of the exhaust gas is utilized to heat the evaporator 4 and the reformer 5 and to heat the oxidant gas flowing through the second preheater 14, and therefore the temperature of the exhaust gas is reduced sufficiently when the exhaust gas reaches the outlet of the exhaust gas passage 19.

In particular, when the fuel cell stack 1 generates an electric power of, for example, 1 kW, it is necessary to supply the oxidant gas at 50 L/min or more from the outside. It is also necessary to increase the temperature of the oxidant gas from the outside air temperature to about 400 to about 800° C. during passage through the first preheater 12, the second preheater 14, and the third preheater 16 before the oxidant gas is supplied to the fuel cell stack 1. To preheat the oxidant gas to the suitable temperature, a large amount of heat is necessary. Therefore, the temperature of the exhaust gas flowing through the exhaust gas passage 19 is sufficiently reduced by heat exchange with the oxidant gas in the second preheater 14 when the exhaust gas reaches the outlet of the exhaust gas passage 19.

As described above, the temperature of the exhaust gas is controlled such that the exhaust gas discharged from the outlet of the exhaust gas passage 19 has the desired temperature, in consideration of the amount of heat absorbed by the evaporator 4 and the reformer 5, the amount of heat absorbed by the second preheater 14, etc. The exhaust gas discharged from the high-temperature operating fuel cell system 100 may exchange heat with water to generate hot water, and the hot water may be stored in a hot water tank. With this structure, the heat generated in the high-temperature operating fuel cell system 100 can be more effectively utilized. When the hot water is generated by heat exchange between the exhaust gas and water, it is preferable that the temperature of the exhaust gas discharged to the outside through the exhaust gas passage 19 falls within the range of 150° C. to 200° C.

In the high-temperature operating fuel cell system 100, by changing the amount of the oxidant gas supplied, the heat recovery performance of each of the first preheater 12, the second preheater 14, and the third preheater 16 can be changed. By changing the heat recovery performance of each of these preheaters, the heat insulating performance of the high-temperature operating fuel cell system 100 can also be changed.

Therefore, in the high-temperature operating fuel cell system 100, by controlling the heat recovery performance of each of the first preheater 12 to the third preheater 16 according to the operating conditions, optimal operating conditions can be maintained. For example, to increase the power generation efficiency of the high-temperature operating fuel cell system 100, the amount of the oxidant gas supplied is increased to improve the heat recovery ability of each of the first preheater 12, the second preheater 14, and the third preheater 16. For example, when the reformer 5, the evaporator 4, the fuel cell stack 1, etc. are heated excessively, the amount of the oxidant gas supplied is reduced to reduce the heat recovery ability of each of the preheaters to thereby increase the amount of heat dissipated from the inside of the high-temperature operating fuel cell system 100 to the outside.

(Effects of Structure Including First Preheater)

Next, the effects of the first preheater 12 provided will be described by comparing a structure including the first preheater 12 disposed between the first heat insulator 21 and the second heat insulator 22 with a structure including no first preheater 12.

In one possible structure, the first heat insulator 21 formed of a general-purpose heat-insulating material such as glass wool is covered directly with the second heat insulator 22 formed of a vacuum heat-insulating material having high heat insulating performance with no first preheater 12 between these insulators. In this structure, since the thermal conductivity of the second heat insulator 22 formed of the vacuum heat-insulating material is excessively small, the temperature on the inner circumferential side of the second heat insulator 22 may increase excessively and exceed the allowable temperature of the vacuum heat-insulating material. To maintain the temperature on the inner circumferential side of the second heat insulator 22 within the allowable temperature range of the vacuum heat-insulating material, it is necessary to increase the thickness of the first heat insulator 21 to thereby improve the heat insulating performance of the first heat insulator 21. In this case, the thickness of the first heat insulator 21 may cause the size and cost of the high-temperature operating fuel cell system 100 to exceed its design specifications.

Figure 2:
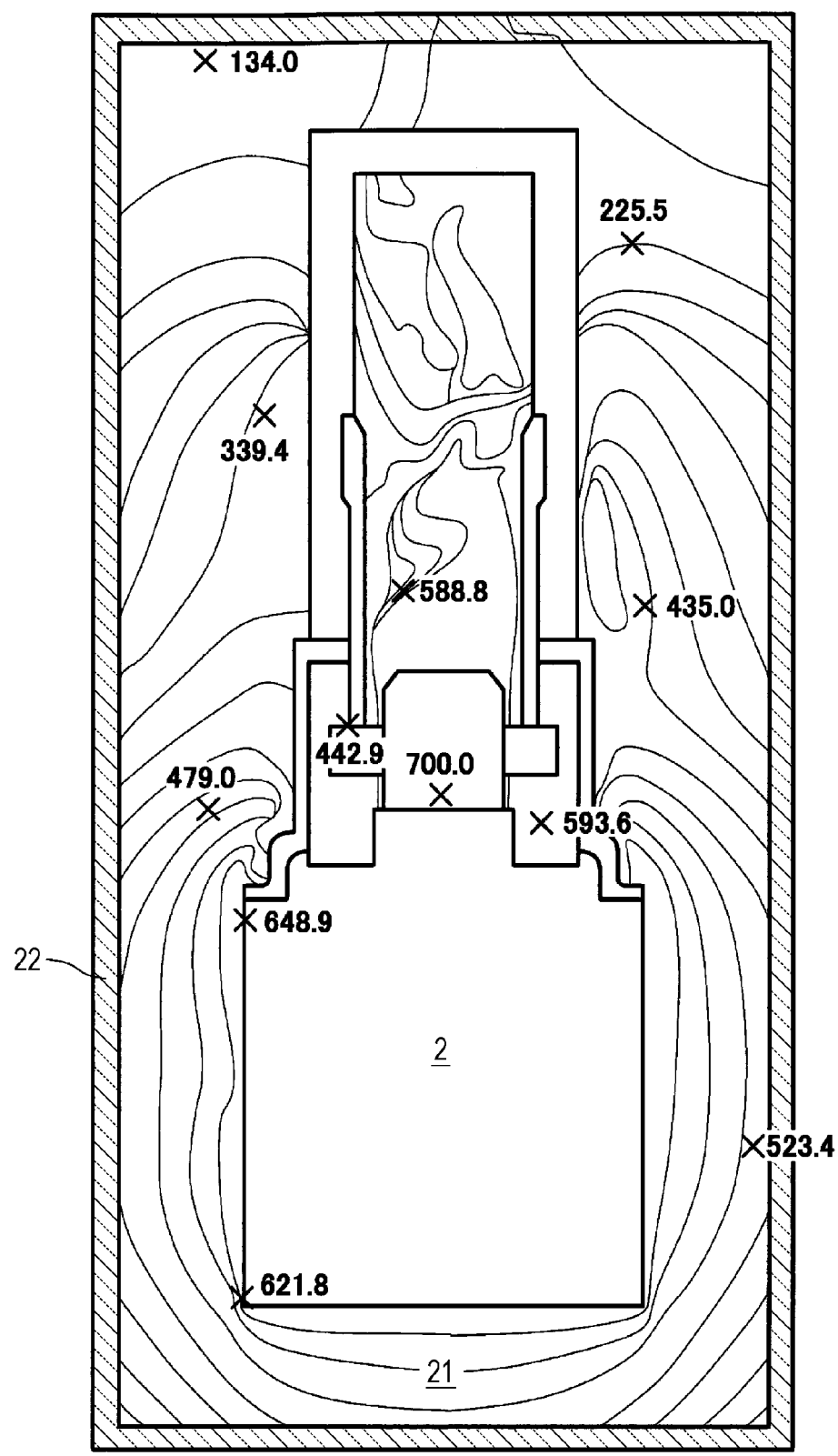
FIG. 2 is an illustration showing an example of a temperature distribution when the high-temperature operating fuel cell system shown in FIG. 1 includes no first preheater.
Figure 3:
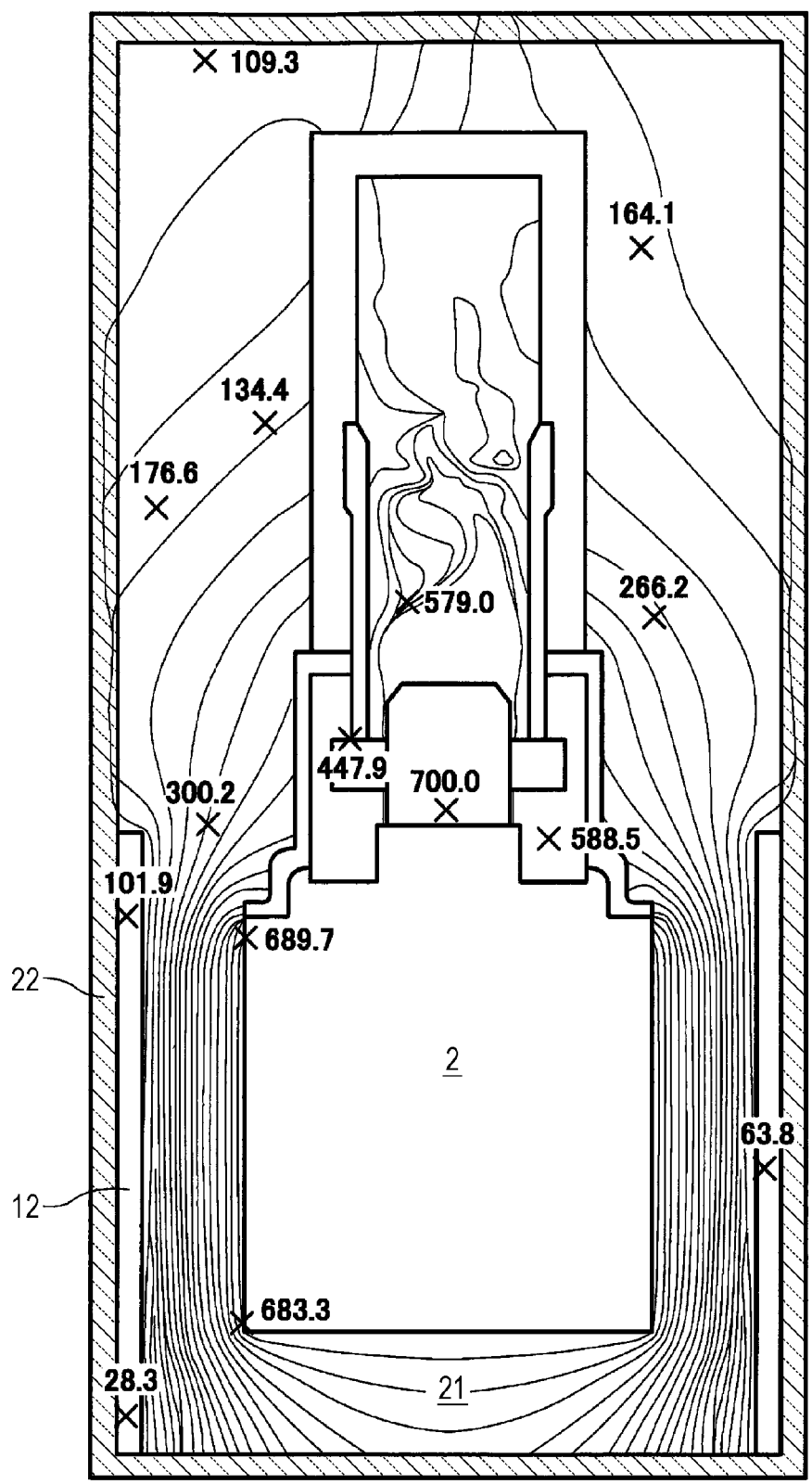
FIG. 3 is an illustration showing an example of the temperature distribution when the high-temperature operating fuel cell system shown in FIG. 1 includes a first preheater.

Referring next to FIGS. 2 and 3, a description will be given of the difference in temperature distribution between a high-temperature operating fuel cell system 100 including the first preheater 12 and a high-temperature operating fuel cell system 100 including no first preheater 12. In these fuel cell systems, the thicknesses of their first heat insulators 21 are the same. FIG. 2 is an illustration showing an example of the temperature distribution when the high-temperature operating fuel cell system 100 shown in FIG. 1 includes no first preheater 12. FIG. 3 is an illustration showing an example of the temperature distribution when the high-temperature operating fuel cell system 100 shown in FIG. 1 includes the first preheater 12. The temperature distributions shown in FIGS. 2 and 3 were determined by thermal fluid analysis (CFD). The heat-insulating material forming the second heat insulator is a vacuum heat-insulating material.

As can be seen from FIGS. 2 and 3, when no first preheater 12 is provided, the temperature on the inner circumferential side of the second heat insulator 22 exceeds 450° C. When the first preheater 12 is provided, the temperature on the inner circumferential side of the second heat insulator 22 is reduced to 160° C. or lower. The above results show that, even when the vacuum heat-insulating material is used as the heat-insulating material of the second heat insulator 22 of the high-temperature operating fuel cell system 100 including the first preheater 12, the temperature of the second heat insulator 22 falls within the allowable temperature range of the vacuum heat-insulating material. By providing the first preheater 12, the amount of heat dissipated from the high-temperature operating fuel cell system 100 that generates an electric power of about 700 W can be reduced by about 70 W.

(Outer Shape of High-Temperature Operating Fuel Cell System)

In the high-temperature operating fuel cell system 100, an inner portion above the combustor 7 within the casing 3 is surrounded by the second preheater 14, and an inner portion below the combustor 7 is surrounded by the third preheater 16. The second preheater 14 and the third preheater 16 are separate members. However, this is not a limitation, and the second preheater 14 and the third preheater 16 may be integrally formed.

The general shape of the casing 3 of the high-temperature operating fuel cell system 100 may be a vertically extending cylindrical shape or a vertically extending cuboidal shape. The cross-sectional dimensions of an upper portion above the combustor 7 may differ from the cross-sectional dimensions of a lower portion below the combustor 7. The upper portion may have a cylindrical shape, and the lower portion may have a cuboidal shape. The upper portion may have a cuboidal shape, and the lower portion may have a cylindrical shape. When the casing 3 of the high-temperature operating fuel cell system 100 has a cylindrical shape, its top and bottom surfaces may each have a circular shape, an elliptical shape, or a running track shape.

When the casing 3 of the high-temperature operating fuel cell system 100 has a cylindrical shape, the area of the outermost surface can be smaller than that when the casing 3 has a cuboidal shape. This is advantageous because the fuel cell system 100 can be reduced in size and the amount of heat dissipated to the outside can be reduced. When the casing 3 has a cylindrical shape, its side surface can be formed by bending a plate material and welding its edges. The number of welding portions can be reduced, and the cost can be reduced.

(Modifications)

Figure 4:
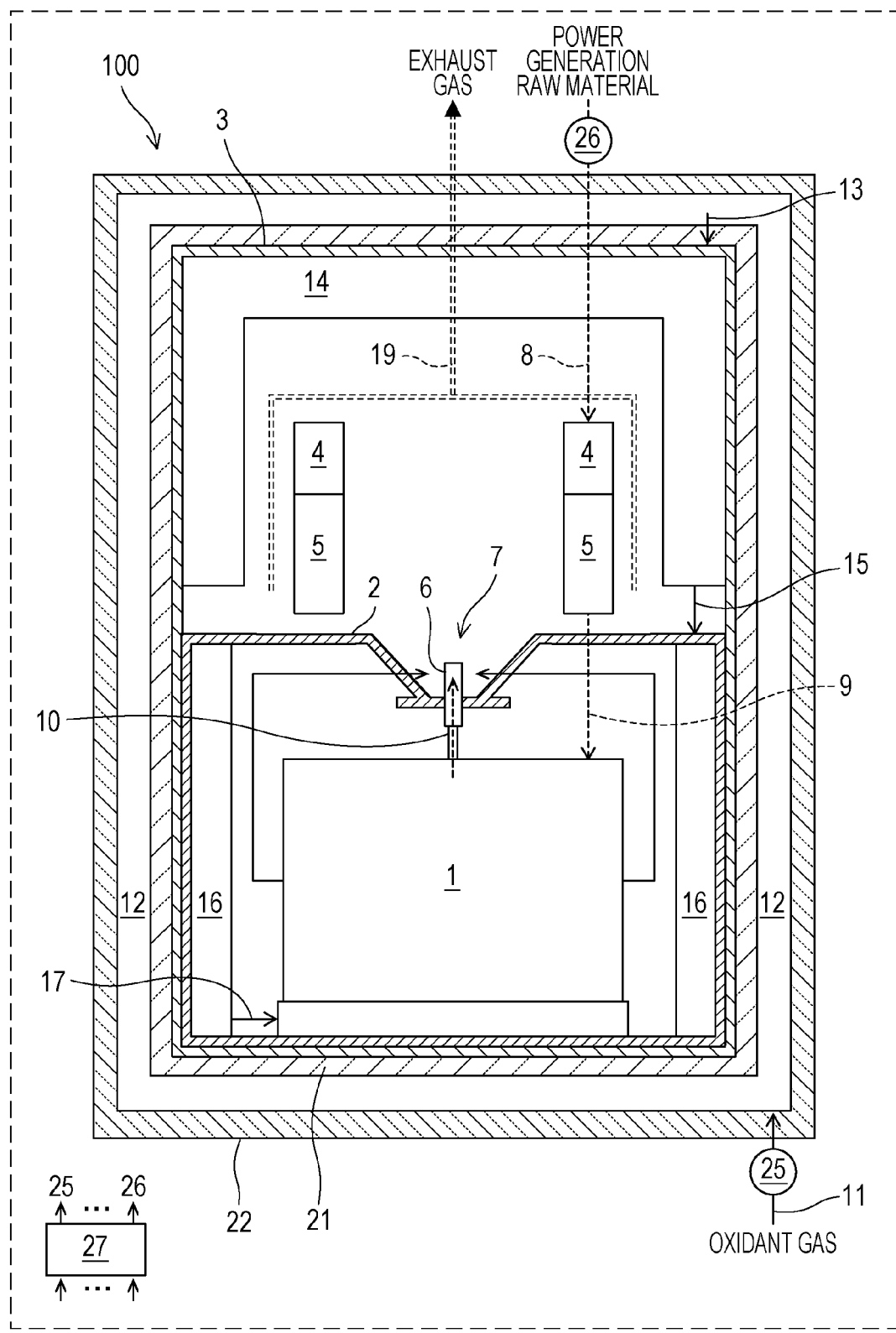
FIG. 4 is a side view showing an example of a schematic structure of a high-temperature operating fuel cell system according to modification 1 of embodiment 1.

In the high-temperature operating fuel cell system 100, the first preheater 12, the first heat insulator 21, and the second heat insulator 22 are disposed on the side surface(s) of the casing 3 of the high-temperature operating fuel cell system 100, but this is not a limitation. The first preheater 12, the first heat insulator 21, and the second heat insulator 22 may cover also the bottom and top surfaces of the casing 3 as shown in FIG. 4 or may cove only one of the bottom and top surfaces. FIG. 4 is a side view showing an example of a schematic structure of a high-temperature operating fuel cell system 100 according to modification 1 of embodiment 1. FIG. 4 shows the structure of a principal part of the high-temperature operating fuel cell system 100 according to modification 1 of embodiment 1 when the fuel cell system 100 is viewed from a side. The fuel cell system 100 may have a cylindrical shape or a cuboidal shape with the lower surface in the drawing sheet serving as a bottom surface and the upper surface serving as a top surface. The high-temperature operating fuel cell system 100 according to modification 1 of embodiment 1 has the same structure as the high-temperature operating fuel cell system 100 according to embodiment 1 except that not only the side surface(s) of the casing 3 but also its upper and bottom surfaces are covered with the first preheater 12, the first heat insulator 21, and the second heat insulator 22. Therefore, the same parts are denoted by the same numerals, and the description thereof will be omitted.

Figure 5:
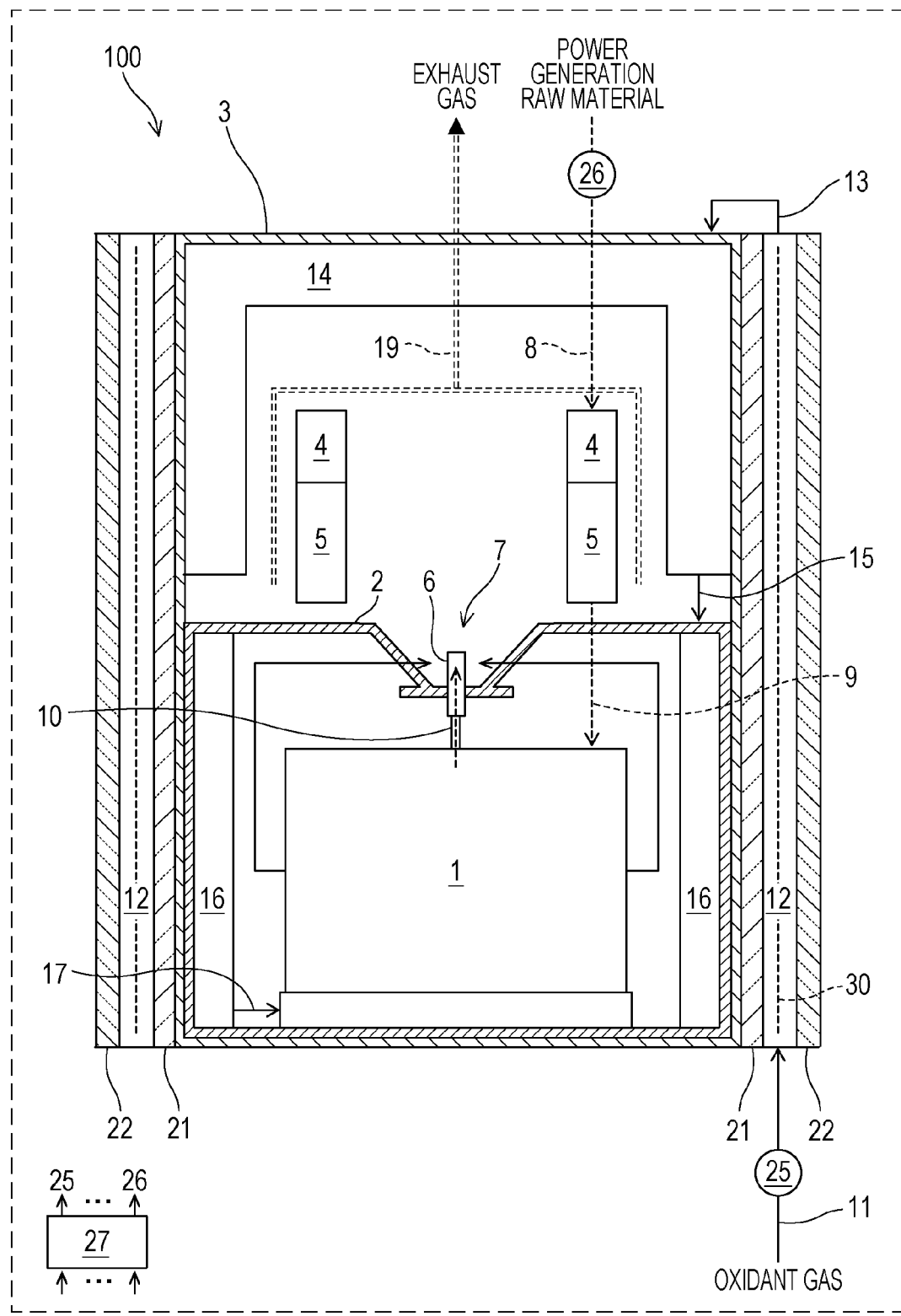
FIG. 5 is a side view showing an example of a schematic structure of a high-temperature operating fuel cell system according to modification 2 of embodiment 1.

As shown in FIG. 5, a dispersing plate 30 may be provided in the flow passage of the oxidant gas in the first preheater 12 in order to improve its heat recovery ability. FIG. 5 is a side view showing an example of a schematic structure of a high-temperature operating fuel cell system 100 according to modification 2 of embodiment 1. FIG. 5 shows the structure of a principal part of the high-temperature operating fuel cell system 100 according to modification 2 of embodiment 1 when the fuel cell system 100 is viewed from a side. The fuel cell system 100 may have a cylindrical shape or a cuboidal shape with the lower surface in the drawing sheet serving as a bottom surface and the upper surface serving as a top surface.

The high-temperature operating fuel cell system 100 according to modification 2 of embodiment 1 has the same structure as the high-temperature operating fuel cell system 100 according to embodiment 1 except that the first preheater 12 further includes the dispersing plate 30. Therefore, the same parts are denoted by the same numerals, and the description thereof will be omitted.

The dispersing plate 30 is a plate-shape member that causes the oxidant gas flowing through the first preheater 12 to be turbulent. By disposing the dispersing plate 30 in the flow passage of the first preheater 12, the thermal conductivity of the oxidant gas flowing through the first preheater 12 can be improved, and the heat recovering ability can thereby be improved.

Embodiment 2

Figure 6:
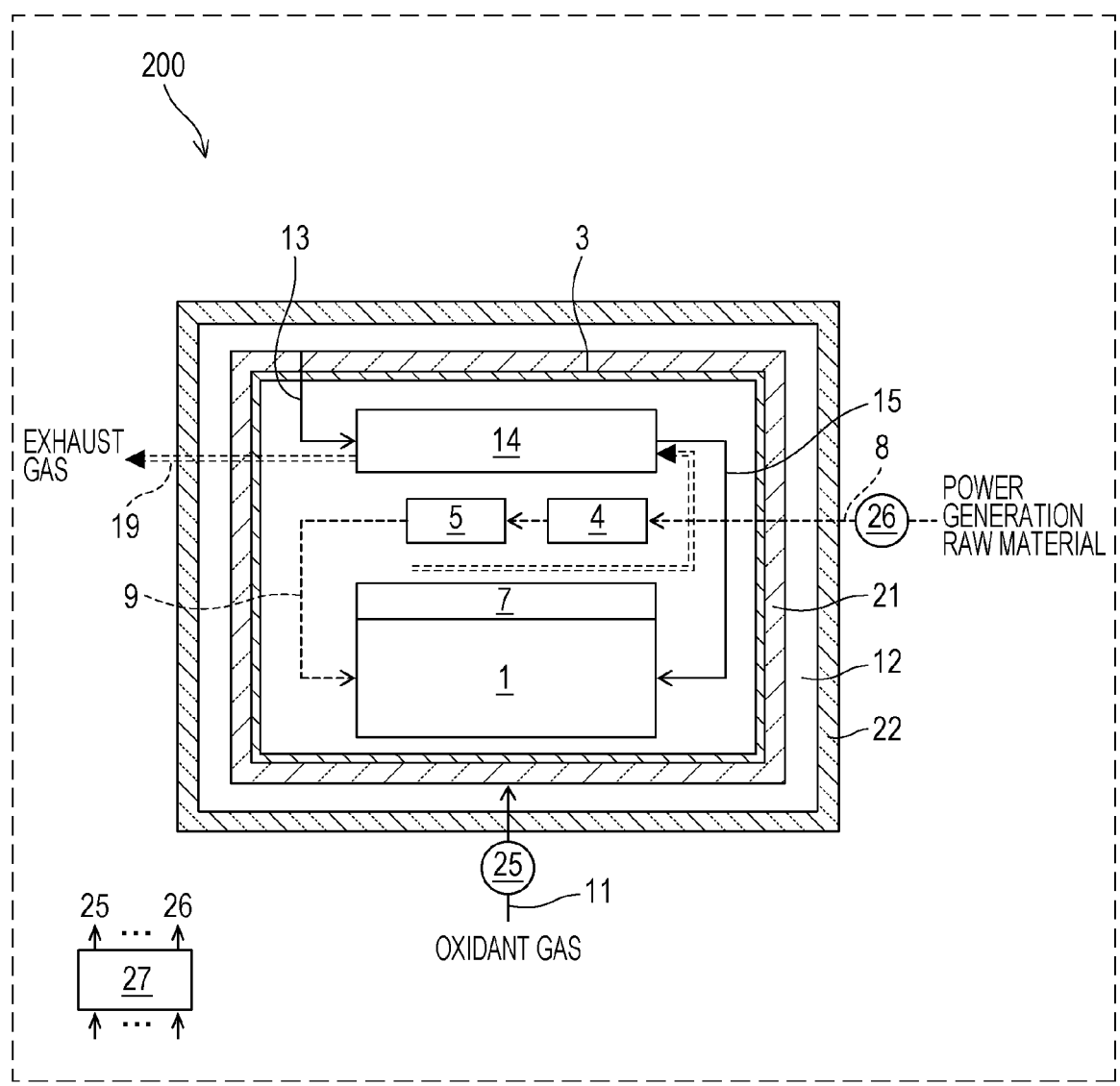
FIG. 6 is a side view showing an example of a schematic structure of a high-temperature operating fuel cell system according to embodiment 2 of the present disclosure.

Referring to FIG. 6, a high-temperature operating fuel cell system 200 according to embodiment 2 will be described. FIG. 6 is a side view showing an example of a schematic structure of the high-temperature operating fuel cell system 200 according to embodiment 2 of the present disclosure. FIG. 6 shows the structure of a principal part of the high-temperature operating fuel cell system 200 when it is viewed from a side. The fuel cell system 200 may have a cylindrical shape or a cuboidal shape with the lower surface in the drawing sheet serving as a bottom surface and the upper surface serving as a top surface.

The high-temperature operating fuel cell system 200 according to embodiment 2 is the same as the high-temperature operating fuel cell system 100 according to embodiment 1 except for the following differences. Therefore, the same parts are denoted by the same numerals, and the description thereof will be omitted.

Specifically, in the casing 3 of the high-temperature operating fuel cell system 100 according to embodiment 1, the fuel cell stack 1 is contained in the fuel cell stack container 2, and the third preheater 16 is disposed on the inner side wall(s) of the fuel cell stack container 2. The evaporator 4, the reformer 5, and the second preheater 14 are disposed outside the fuel cell stack container 2. The outer side surface(s) of the casing 3 is(are) covered with the first heat insulator 21, the first preheater 12, and the second heat insulator 22.

The high-temperature operating fuel cell system 200 according to embodiment 2 differs from the fuel cell system 100 in that the fuel cell stack container 2 and the third preheater 16 are not provided. The casing 3 of the high-temperature operating fuel cell system 200 according to embodiment 2 has a relatively simple structure. Specifically, the fuel cell stack 1 is disposed in the space in which the evaporator 4, the reformer 5, the combustor 7, the second preheater 14, etc. are disposed. The outer circumference of the casing 3 is covered with the first heat insulator 21, the first preheater 12, and the second heat insulator 22.

In the high-temperature operating fuel cell system 200 according to embodiment 2, the oxidant gas flowing through the first preheater 12 disposed on the outer circumference of the casing 3 is used to recover the heat transferred from the casing 3 in order to reduce the amount of heat dissipated from the inside of the casing 3 to the outside. The oxidant gas is thereby preheated.

The oxidant gas preheated in the first preheater 12 is supplied to the second preheater 14 through the oxidant gas casing supply passage 13. In the second preheater 14, the oxidant gas supplied through the oxidant gas casing supply passage 13 exchanges heat with the exhaust gas generated in the combustor 7, and the oxidant gas is further preheated to about 400 to about 800° C. Then the preheated oxidant gas is supplied to the fuel cell stack 1 and used for power generation.

As described above, since the oxidant gas supplied to the fuel cell stack 1 through the first preheater 12 and the second preheater 14 can be heated to an appropriate temperature, the stability of the temperature of the fuel cell stack 1 during operation can be increased. In addition, the heat in the casing 3 can be effectively recovered through heat exchange with the oxidant gas in the first preheater 12 and the second preheater 14, so that the power generation efficiency can be improved.

Even when the evaporator 4, the reformer 5, the combustor 7, the second preheater 14, the fuel cell stack 1, etc. are contained in the same space within the casing 3 as described above, the high-temperature operating fuel cell system 200 can be reduced size and improved in power generation efficiency and reliability by disposing the first heat insulator 21, the first preheater 12, and the second heat insulator 22 on the outer circumference of the casing 3.

In the high-temperature operating fuel cell system 200 according to embodiment 2, the entire outer circumference of the casing 3 is covered with the first heat insulator 21, the first preheater 12, and the second heat insulator 22, but this is not a limitation. For example, the first heat insulator 21, the first preheater 12, and the second heat insulator 22 may cover only the outer side surface(s) of the casing 3 or may cover only the outer side of the bottom surface. Alternatively, the outer side surface(s) and the outer side of the bottom surface may be covered.

From the foregoing description, many modifications and other embodiments are apparent to those skilled in the art. Therefore, the foregoing description is to be construed as illustrative only and is provided for the purpose of teaching those skilled in the art the best mode of carrying out the present disclosure. The details of the structure and/or functions of the present disclosure may be substantially modified without departing from the spirit of the present disclosure.

The present disclosure can be widely used for high-temperature operating fuel cells such as SOFCs and MCFCs that can utilize high-temperature exhaust heat.

What is claimed is:

1. A high-temperature operating fuel cell system comprising:
   a fuel cell stack that includes a cathode and an anode and generates electric power through an electrochemical reaction of an oxidant gas supplied to the cathode and a reformed gas supplied to the anode;
   a combustor that combusts a cathode off-gas discharged from the cathode of the fuel cell stack and an anode off-gas discharged from the anode;
   a reformer that generates the reformed gas from a raw material supplied, the reformed gas being generated through a reforming reaction by utilizing heat of an exhaust gas generated by the combustor;
   a first preheater;
   a second preheater that preheats the oxidant gas through heat exchange with the exhaust gas whose heat has been partially used for the reforming reaction in the reformer and supplies the preheated oxidant gas to the cathode of the fuel cell stack;
   a casing that contains the fuel cell stack, the combustor, the reformer, and the second preheater;
   a first heat insulator that covers at least part of an outer circumference of the casing;
   a fuel cell stack container that contains the fuel cell stack and allows the cathode off-gas discharged from the cathode of the fuel cell stack to flow inside the fuel cell stack container and to be introduced into the combustor; and
   a third preheater that is disposed on an inner wall of the fuel cell stack container, preheats the cathode off-gas flowing through the fuel cell stack container, and further preheats the oxidant gas preheated in the second preheater before the oxidant gas is supplied to the fuel cell stack,
   wherein the first preheater covers an outer circumference of the first heat insulator and preheats the oxidant gas by heat transferred from inside of the casing through the first heat insulator before the oxidant gas is supplied to the second preheater.

2. The high-temperature operating fuel cell system according to claim 1, further comprising
   a second heat insulator that covers an outer circumference of the first preheater.

3. The high-temperature operating fuel cell system according to claim 1,
   wherein the combustor is disposed on an upper surface of the fuel cell stack container, and
   wherein the first preheater surrounds at least a side portion of the fuel cell stack container and a side portion of the combustor.

4. The high-temperature operating fuel cell system according to claim 1,
   wherein the oxidant gas flows through the first preheater, the second preheater, and the third preheater in this order and is then supplied to the fuel cell stack,
   wherein the first preheater preheats the oxidant gas supplied from outside by heat transferred from the inside of the casing through the first heat insulator,
   wherein the second preheater preheats the oxidant gas preheated in the first preheater by the heat of the exhaust gas that has been partially used for the reforming reaction in the reformer, and
   wherein the third preheater preheats the oxidant gas preheated in the second preheater by heat of the cathode off-gas flowing through the fuel cell stack container.

5. The high-temperature operating fuel cell system according to claim 4,
   wherein the reformer is disposed above the combustor, and the fuel cell stack is disposed below the combustor,
   wherein the casing further contains:
      a first oxidant gas passage which is disposed between the second preheater and the third preheater and through which the oxidant gas flows from the second preheater to the third preheater; and
      an exhaust gas passage through which the exhaust gas generated in the combustor flows and is introduced to the outside, and
   wherein the reformer, the combustor, the fuel cell stack, and the exhaust gas passage are surrounded by the second preheater, the first oxidant gas passage, and the third preheater.

6. The high-temperature operating fuel cell system according to claim 2,
   wherein the second heat insulator is formed of a vacuum heat-insulating material.

7. The high-temperature operating fuel cell system according to claim 1, further comprising
   an oxidant gas flow rate controller that controls a flow rate of the oxidant gas supplied to the first preheater,
   wherein the oxidant gas flow rate controller controls the flow rate of the oxidant gas, thereby adjusting an amount of heat dissipated from the inside of the casing to the outside.

8. The high-temperature operating fuel cell system according to claim 2, further comprising
   an oxidant gas flow rate controller that controls a flow rate of the oxidant gas supplied to the first preheater,
   wherein the oxidant gas flow rate controller controls the flow rate of the oxidant gas such that a temperature of an inner circumference of the second heat insulator is 200° C. or lower.

9. The fuel cell system according to claim 1, wherein the fuel stack includes solid oxide fuel cells.

10. The fuel cell system according to claim 1, wherein the fuel stack includes molten carbonate fuel cells.

* * * * *